Jan. 2, 1968 LA VERNE WINKLE ETAL 3,361,977

SIGNAL POWERED DECODER

Filed May 15, 1964 7 Sheets-Sheet 1

INVENTORS.
LaVERNE WINKLE
FRANKLIN R. GNAU
BY Alden D. Redfield
Charles M. Hogan
ATTORNEYS.

Jan. 2, 1968 LA VERNE WINKLE ETAL 3,361,977

SIGNAL POWERED DECODER

Filed May 15, 1964 7 Sheets-Sheet 2

INVENTORS.
LAVERNE WINKLE
FRANKLIN R. GNAU
BY Alden D. Redfield
Charles M. Hogan
ATTORNEYS.

Jan. 2, 1968 LA VERNE WINKLE ETAL 3,361,977

SIGNAL POWERED DECODER

Filed May 15, 1964 7 Sheets-Sheet 3

INVENTORS.
LAVERNE WINKLE
FRANKLIN R. GNAU
BY Alden D. Redfield
Charles M. Hogan
ATTORNEYS.

Jan. 2, 1968 LA VERNE WINKLE ETAL 3,361,977

SIGNAL POWERED DECODER

Filed May 15, 1964 7 Sheets-Sheet 4

INVENTORS.
LAVERNE WINKLE
FRANKLIN R. GNAU

BY Allen D. Redfield
Charles M. Hogan
ATTORNEYS.

INVENTORS.
LaVERNE WINKLE
FRANKLIN R. GNAU
BY Alden D. Redfield
Charles M. Hogan
ATTORNEYS.

INVENTORS.
LaVERNE WINKLE
FRANKLIN R. GNAU
BY Alden D. Redfield
Charles M. Hogan
ATTORNEYS.

INVENTORS.
LAVERNE WINKLE
FRANKLIN R. GNAU
BY Alden D. Redfield
Charles M. Hogan
ATTORNEYS.

United States Patent Office 3,361,977
Patented Jan. 2, 1968

3,361,977
SIGNAL POWERED DECODER
La Verne Winkle and Franklin R. Gnau, Cincinnati, Ohio, assignors to Avco Corporation, Richmond, Ind., a corporation of Delaware
Filed May 15, 1964, Ser. No. 367,837
2 Claims. (Cl. 325—492)

ABSTRACT OF THE DISCLOSURE

This is a signal powered decoder and detonator system. Bursts of radio frequency energy are intercepted, applied to a tuned transformer and converted into pulse signals by tunnel diodes which are connected to the primaries of a pair of pulse transformers. The transformers are driven in output summing fashion and the rectified pulses are applied to a storage capacitor, which is periodically discharged by a complementary transistor pair, through an energy delivery network. Energy is delivered when a threshold circuit senses that the potential across this capacitor is adequate. The converted pulses are applied to an amplifier-demodulator which in turn applies pulses to a decoder. When the demodulated bursts of energy satisfy a predetermined code, then a firing circuit is energized. The converter, the amplifier, the decoder and the firing circuit are energized from the converter.

Modern military requirements have given rise to a need for a decoding device which derives its operating power entirely from electromagnetic wave signals. Such a decoder offers a number of advantages including minimum maintenance, independence of any external power supply, and freedom from any need to replace the power source. The present invention fills this need.

A primary object of the invention is to provide signal processing circuitry which is powered entirely by energy extracted from electromagnetic wave signals.

Another object of the invention is to provide novel means for the collection and storage of radiated power in combination with means for utilizing such power, after it reaches a threshold value, to drive intelligence processing equipment associated therewith.

Another object of the invention is to provide a command receiver and decoder which is powered entirely by energy extracted from the electromagnetic field of a remotely located transmitter.

Additional objects of the invention are to provide a receiver and decoder of long life so arranged as to be readily manufacturable by high density packing and microelectronic techniques.

A further object of the invention is to provide signal powered means for decoding and verifying received pulses and generating a command signal upon reception of the proper combination of pulses.

For a better understanding of the invention, together with other and further objects, advantages, and capabilities thereof, reference is made to the following description of a preferred embodiment of the invention as included in a remotely controlled receiver/decoder for detonating purposes.

Figure 1:
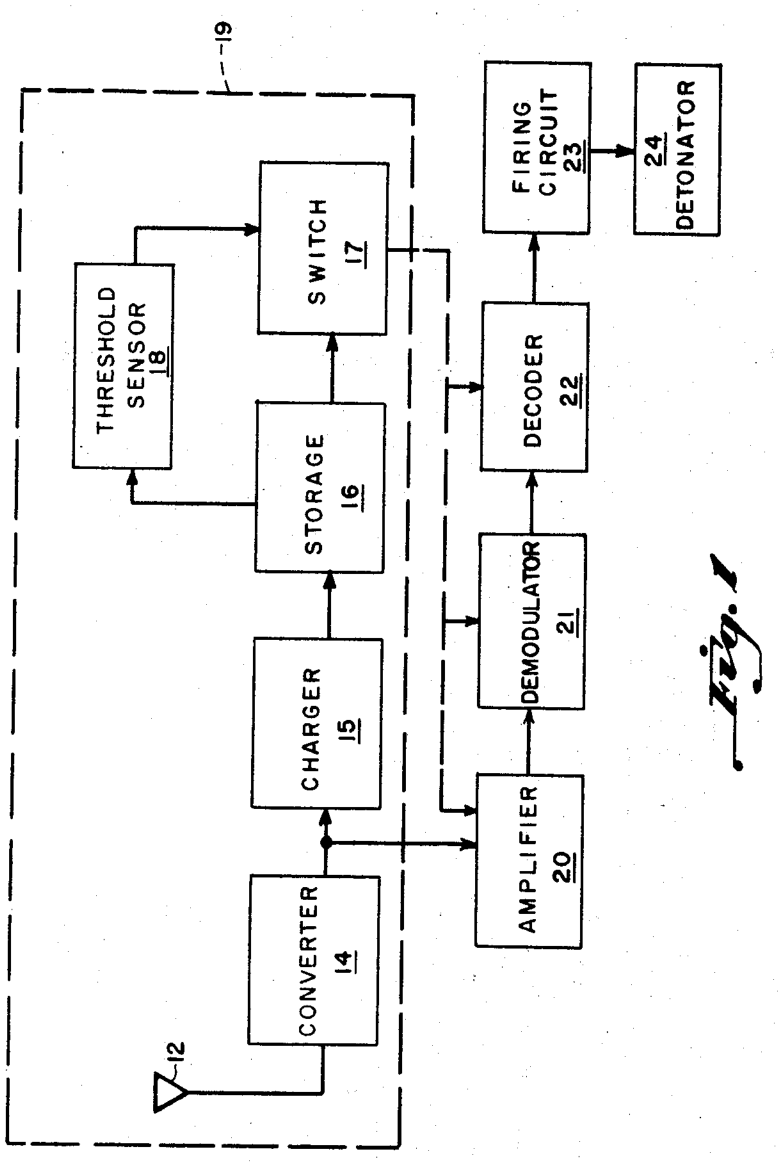
FIG. 1 is a block diagram of the entire receiver/decoder and detonating system.

Referring first to FIG. 1, note is made of the complete absence of a power supply. Pulse width modulated electromagnetic wave signals are intercepted by an antenna 12 and applied to a converter device 14. The converter 14 is coupled to a charging circuit 15 for an energy storage device 16, which in turn controls a switch 17 included in a threshold sensing arrangement generally indicated by the reference numeral 18. The operation of these units included within the block 19 of FIG. 1 is such that, when sufficient power is collected in the energy storage device 16, this fact is sensed by device 18, closing the switch 17 and supplying power to the signal processing circuitry which comprises the following units in cascade: amplifier 20, demodulator 21, and decoder 22. When the code is satisfied, a command is generated by the decoder 22 and then a firing circuit 23 causes detonation or other desired event at 24.

Figure 8:
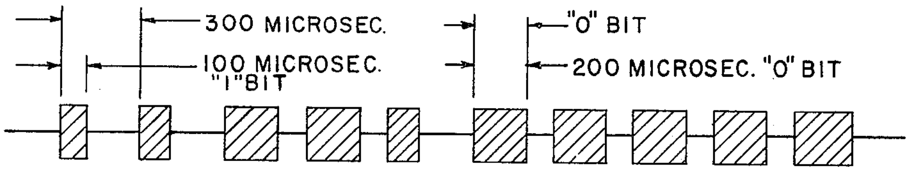
FIG. 8 is an illustration of the code structure of the radio frequency signals received at the receiver antenna.

The coded message consists of a pulse width modulated format (FIG. 8). When the proper signal is matched in the decoder 22, the desired command function is performed.

Figure 9:
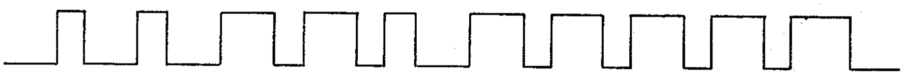
FIG. 9 is an illustration of the converted pulses produced by such signals as such pulses appear in the transformer secondary of the energy converter.

It is reiterated that all the operating power is derived from the electromagnetic radiations. Accordingly, attention is now invited to the converting circuit of FIG. 2. The radiated signal is intercepted by a suitable antenna 12, in series with the primary of a tuned transformer 60, which is arranged to provide single-ended to push-pull transformation and is center-tapped to ground by a conductive connection 61. The transformer is tuned by a shunt capacitor 62, and its terminals (i.e., the high sides of the secondary circuit) are connected in push-pull to drive tunnel diodes 25 and 26, each diode being connected in series with a primary 27 or 28 of a pair of pulse transformers. The tunnel diodes 25 and 26 sense modulation energy and drive the pulse transformers 29 and 30 in output-summing fashion. The pulse modulated radio signals (FIG. 8) are converted in both diodes to pulse envelopes (FIG. 9). Referencing antenna connection to the primary winding, positive excursions in the radio frequency signal are rectified by tunnel diode 25 and negative excursions by diode 26. The positive rectified signals will be impressed on primary 27 of transformer 29 and primary 28 of transformer 30. The pulse signal outputs of transformers 29 and 30 are added by series connection of their secondaries. The resultant converted pulses (FIG. 9) are applied via conductor 31 to the amplifier illustrated in FIG. 3. Additionally, the converted pulses are applied to a charging or rectifying diode 15 in series with both secondaries. That is to say, the rectified output of diode 15 is applied to a storage capacitor 16, while the signals appearing at the anode of diode 15 are fed to the signal processing circuitry the capacitor is incremently charged. When the voltage across capacitor 16 reaches a predetermined value, say 3 volts, a threshold sensing circuit 18 causes the capactor voltage to be applied (via line 63) to the demodulator and decoder circuitry.

A resistive connection 32 is made from conductor 31 to the base of NPN type transistor 33, so that the pulse width signals also drive the base of transistor 33. Rectified energy is stored in progressive increments in capacitor 16, which charges along a generally staircase voltage-time characteristic, until PNP transistor 17 fires, upon the attainment of the threshold condition at the base of transistor 33. Capacitor 16 is connected between the cathode of rectifier 15 and ground, and the emitter-collector circuit of transistor 17 is placed in series with collector load resistor 34 and the combination of elements 17 and 34 is placed across capacitor 16. This arrangement of transistors 33 and 17 acts in a manner somewhat similar to a Schmitt trigger circuit and is such that when transistor 17 becomes conductive or fires, capacitor 16 dicharges through transistor 17 and resistor 34. The flow of discharge current continues until the combination of the input signals applied to the base of transistor 33 and the voltage across resistor 34 causes transistor 17 to cut off. The cut-off level is considerably lower than the cut-in level, by 40% in a typical installation, so that this trigger circuit has considerable hysteresis.

The absence of radiated signal to the antenna results in no power drive on the active equipment. A signal to the converter 14 of sufficient intensity in amplitude and time will produce power for driving the signal processing equipment. Otherwise, there is no action.

Figure 7:
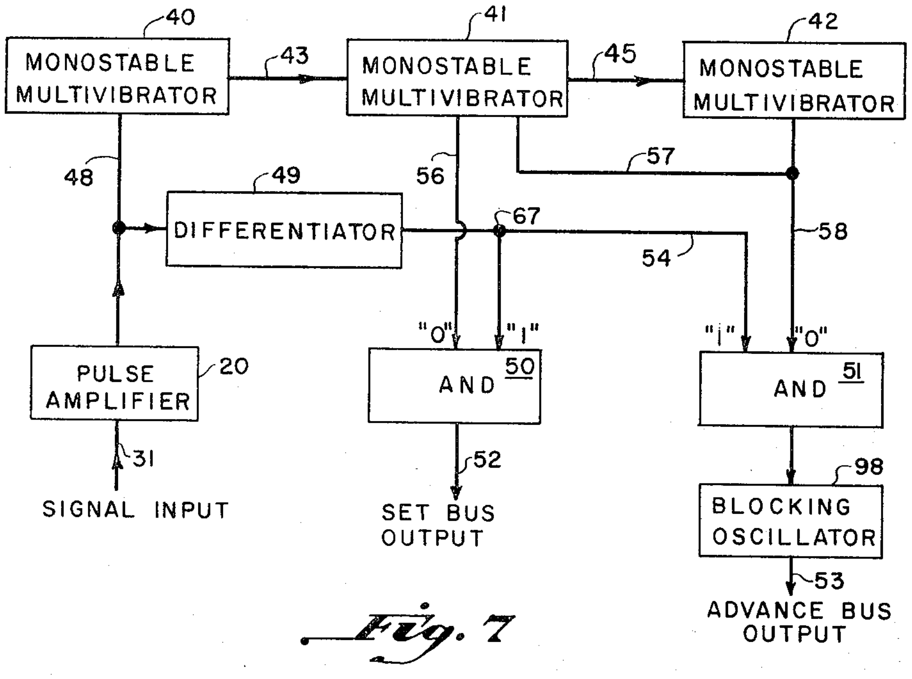
FIG. 7 is a block diagram of the demodulator.

The amplifier and demodulator are illustrated in block diagram in FIG. 7. Attention is first invited to the characteristics of the received R.F. signals as illustrated in FIG. 8 and the video pulse output appearing on line 31, as illustrated in FIG. 9. This discussion postulates that the coded signal received is binary 11001. The binary one bit is transmitted by pulse width modulation and is 100 microseconds long. The binary zero bit is 200 microseconds long. It will be seen from the following that the demodulator recognizes the reception of either of these pulses by producing an "advance" pulse on line 53. The demodulator recognizes a "one" bit by generating a "set" pulse on line 52. Accordingly the demodulator comprises, inter alia, a pair of coincidence gates or AND circuits 50 and 51, the output of gate 50 producing "set" pulses and the output of gate 51 triggering a blocking oscillator 98 which produces "advance" pulses.

Still referring to FIG. 7, the pulse signal input to the demodulator is applied via line 31 to the video amplifier 20, amplified, and utilized to trigger the first of a chain of monostable multivibrators 40, 41, and 42. That is, the leading edge of each amplified pulse is used to trigger reference multivibrator 40. Multivibrator 41 is triggered by multivibrator 40, and multivibrator 42 is triggered by multivibrator 41.

In order to provide comparison data for the coincidence gates 50 and 51, the pulse signals are differentiated by a circuit 49, also coupled to the output of the pulse amplifier 20, and the trailing edges of the resultant pulses are applied to gates 50 and 51, via point 67.

Each pulse from multivibrator 41 is applied to gate 50 via line 56. This pulse is delayed from the differentiator output, so that this pulse coincides with the inverted differentiator output for the 100 microsecond binary one, but does not coincide with the inverted output at point 67 for the binary zero. Therefore gate 50 provides a "set" pulse output only when reception of a binary one is recognized.

Gate 51 provides an "advance" pulse either when a binary one is received or when a binary zero is received. As to the binary one, the gate 51 makes the same comparison as does the gate 50, because the same input data are applied to it via lines 54 and 57. As to the binary zero, attention is invited to the output line 58 between multivibrator 42 and gate 51. The pulse output of multivibrator 42 is delayed from the amplified pulse at point 67 so that it coincides with the inverted output at 67 for only the 200 microsecond pulse, or binary zero. Suffice it to say that when a binary one is received, the outputs of the differentiator 49 and the multivibrator 41, as applied to gate 51, produce an "advance" pulse. When a "zero" is received, the outputs of the differentiator and multivibrator 42, as applied to gate 51, produce an "advance" pulse.

Figure 3:
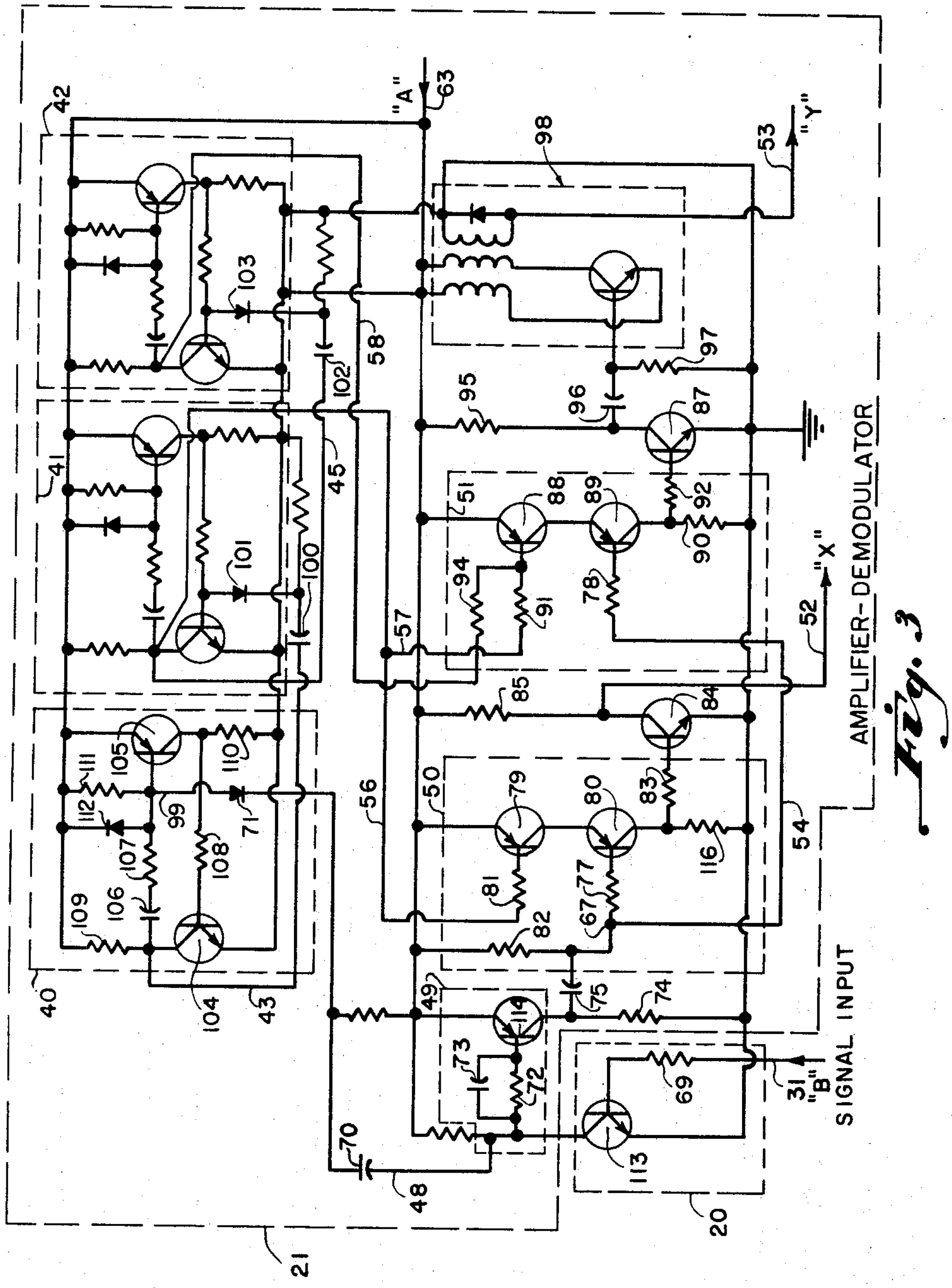
FIG. 3 is a circuit diagram of the amplifying and demodulating unit included in the FIG. 1 system.

This description of FIG. 7 is to some degree oversimplified, as will appear from the detailed descripition of FIG. 3. It will be understood that what is shown in FIGS. 3 and 7 is a pulse width discriminator.

Referring now to FIG. 3 for a more rigorous showing of the amplifier and demodulator, the signal input is applied to the base of NPN transistor 113 of amplifier stage 20 from line 31 via resistor 69. The collector of transistor 113 is coupled to the input line 99 of multivibrator 40, via conductor 48, capacitor 70, and diode 71. The output of stage 20 is also coupled to a differentiating circuit 49 comprising a PNP transistor 114 and associated resistance and capacitance elements 72 and 73. The collector has a load resistor 74 and is coupled via capacitor 75 to an output point 67 which is coupled to the gate circuits 50 and 51 by the network comprising base resistors 77 and 78 and conductor 54. That is to say, the differentiator 49 output is coupled to the input circuits of gates 50 and 51, as has previously been stated. The gate circuit 50 comprises transistors 79 and 80, arranged with their emitter-collector circuits in series with each other and with a collector load resistor 116. Both transistors are of PNP type. Transistor 80 has base resistor 77, and transistor 79 has base resistor 81. In series between energizing line 63 and base resistor 77 is a resistor 82. The output of gate 50 is coupled via resistor 83 to an NPN type inverter transistor 84, the output of which is the "set" pulse line 52. Transistor 84 has a collector load resistor 85. From what has already been said, the construction of gate 51 and inverter 87 will be understood. The gate 51 comprises transistors 88 and 89, collector load resistor 90, and base resistors 78 and 91. The output of gate 51 is coupled to inverter 87 via a resistor 92. Lines 56 and 57 are the outputs from multivibrator 41 into gates 50 and 51, respectively. Line 58 is the output from multivibrator 42 to the input resistance 94 of gate 51.

The inverter stage 87 has a collector load resistor 95, and the stage works, via series capacitor 96 and shunt resistor 97, into a blocking oscillator collectively designated by the reference numeral 98. It will be noted that FIG. 7 is simplified in that the inverter stage is omitted between the output of gate 50 and "set" pulse output line 52; also in that the inverter 87 is omitted between the output of gate 51 and blocking oscillator 98.

The construction and operation of multivibrators 40, 41, and 42 will be understood from a description of representative multivibrator 40 alone, together with the arrangements by which units 40, 41, and 42 are cascaded. It has already been stated that the signal input to multivibrator 40 is via input line 99. The output line 43 of multivibrator 40 is coupled, via capacitor 100, to the inputs of multivibrator 41. The output line 45 of multivibrator 41 is similarly coupled to the inputs of multivibrator 42 by a capacitor 102.

Now then, specifically describing multivibrator 40 as illustrative, it comprises NPN transistor 104 and PNP transistor 105. The collector of transistor 104 is coupled to the base of 105 by a capacitor 106 and resistor 107. The collector of transistor 105 is coupled to the base of 104 by a resistor 108. The base of 105 is the input for this multivibrator, and the collector of 104 is the output. Resistor 109 is the collector load for transistor 104, and resistor 110 is the collector load for transistor 105. Between emitter and base of 105 is a resistor 111 shunted by a diode 112. Attention is now directed to the energizing line 63 which is connected directly to the emitters of the PNP transistors in multivibrators 40, 41, and 42, and also to the emitters of transistors 114, 79, and 88. It is further connected to the collectors of the NPN transistors in the amplifier and modulator via resistors or other impedance.

Attention is invited to this feature of the threshold device 18 and multivibrators 40, 41, and 42 and the memory elements of the decoder: to wit, the liberal use of complementary transistor pairs, greatly advantageous from the standpoint of low power requirement.

The demodulator circuitry (FIGS. 3 and 7) just described feeds the decoder (FIGS. 4 and 5) in this fashion: A binary one input appears at the decoder 22 as two pulses—i.e., a "set" pulse on line 52 and, after a short delay, an "advance" pulse on line 53. A binary zero input appears as a pulse on line 53. A binary zero input appears as a pulse on the "advance" input only (i.e., line 53, FIG. 4). Considering for the moment some aspects of the decoder block diagram of FIG. 5, the decoder comprises five complementary flip flop circuits 118–122, inclusive. These circuits provide the registers or memory elements. Initially, each of the elements 118–122 is in the "zero" state, or off. Element 118 is turned on by a "set" pulse. Each flip flop provides its output only when it changes from the "one," or on, state to the "zero," or off, state. Now, when a pulse is applied to the "advance" input line 53, any of the flip flops 118–122 that may be conducting at the time are turned off. Each flip flop in the chain is succeeded by a blocking oscillator, the oscillator elements being numbered 123–127, inclusive. The operation is such that whenever one of the flip flops 118–122 is turned off, its output is used to activate the immediately associated blocking oscillator. The output of each blocking oscillator 123–126 is differentiated, and the trailing edge of the resultant wave form is used to trigger the next succeeding flip flop. The output of 127 is applied to AND gate 157. The delay provided in each blocking oscillator allows the "advance" pulse to clear. Assuming the proper sequence of binary bits to have been applied to the decoder, the chain of flip flops assumes the same status as the incoming code structure. Upon application of the last bit in the code, the "advance" pulse causes all flip flops then in the "one" state to trigger their associated oscillators and to provide outputs; all flip flops in the "zero" state give no outputs.

Figure 4:
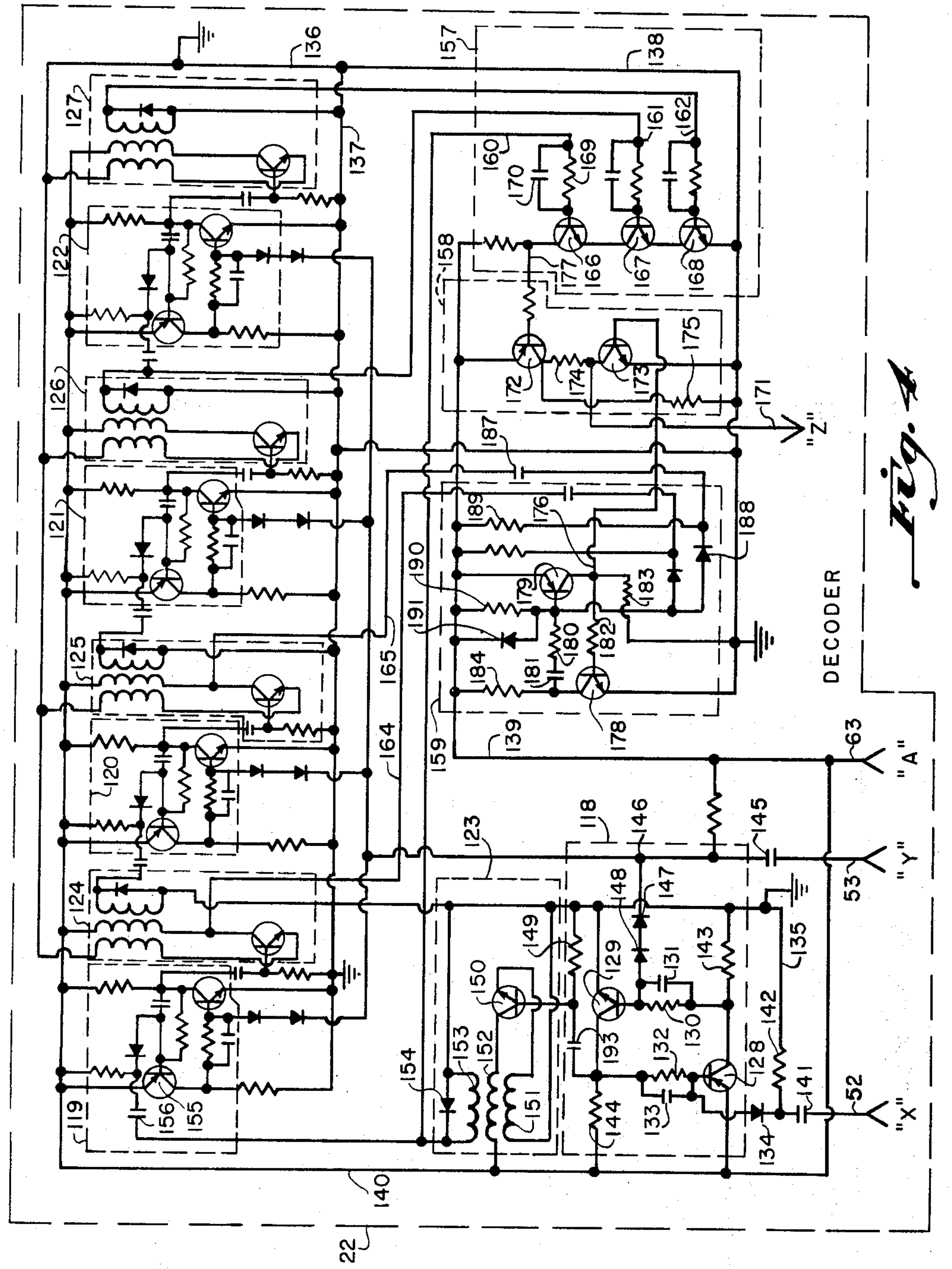
FIG. 4 is the circuit schematic of the decoder included in said system.

In order to abbreviate the description of the register portion of the FIG. 4 decoder, the specific description will be confined to that portion of the chain comprising flip flop 118 and oscillator 123 and those portions of the circuitry by which the several groups of such flip flop and oscillator pairs are cascaded, such groups being generally similar in construction and operation. The first flip flop 118 comprises a complementary pair of transistors 128 and 129. Resistor 130, shunted by capacitor 131, is connected between the collector of transistor 128 and the base of transistor 129. Similarly, resistance 132 and capacitor 133 are connected in parallel and inserted between the collector of transistor 129 and the base of transistor 128. The "set" pulse input is applied, via line 52 and diode 134, to the base of PNP transistor 128 to turn the complementary flip flop 118 on.

Attention is now invited to the fact that the following conductors are grounded: 135, to which the emitter of transistor 129 is connected, and conductors 136, 137, and 138 (FIG. 4). The following conductors have potential applied to them from the converter system, via line 63: conductor 139 and conductor 140 (FIG. 4). The "set" pulse input coupling to flip flop 118 includes a series capacitor 141 and a shunt resistor 142. The emitter-collector circuit of transistor 128 is connected in series with collector load resistor 143 and between conductor 140 and ground. The emitter-collector circuit of transistor 129 is, in complementary fashion, connected in series with collector load resistor 144 between conductor 140 and ground.

Referring now to the "advance" pulse input to flip flop 118, each "advance" pulse being operative to turn flip flop 118 off in the event it is on, "advance" pulses are applied via line 53 and series capacitor 145 to point 146. In the case of flip flop 118, the "advance" pulse coupling system into the flip flop continues from point 146 through diodes 147 and 148.

The collector of transistor 129 is coupled, via differentiating capacitor 193 and shunt resistor 149, to the base of an NPN transistor 150 included in blocking oscillator 123, which oscillator includes three windings, of which that numbered 151 is connected between emitter and ground; that numbered 152 is connected between collector and conductor 140; and that numbered 153 is paralleled by diode 154 and connected between ground and the succeeding flip flop 119. It will be observed that the "advance" pulse line 53 is common to all of the flip flops, that the energizing conductor 63, 139, 140 is common to all of the flip flops and blocking oscillators, and that the grounded line system 135, 136, 137 provides a common ground for all of the elements of FIG. 4, so that no specific description of the flip flops 119–122 and the blocking oscillators 124–127 is either necessary or desirable herein. The description of 118–119 is representative and adequate.

It is noted that the blocking oscillator winding 153 is coupled to the base circuit of transistor 155 of flip flop 119 via a coupling capacitor 156. In like manner, blocking oscillator 124 is coupled to flip flop 120, and so forth.

Figure 5:
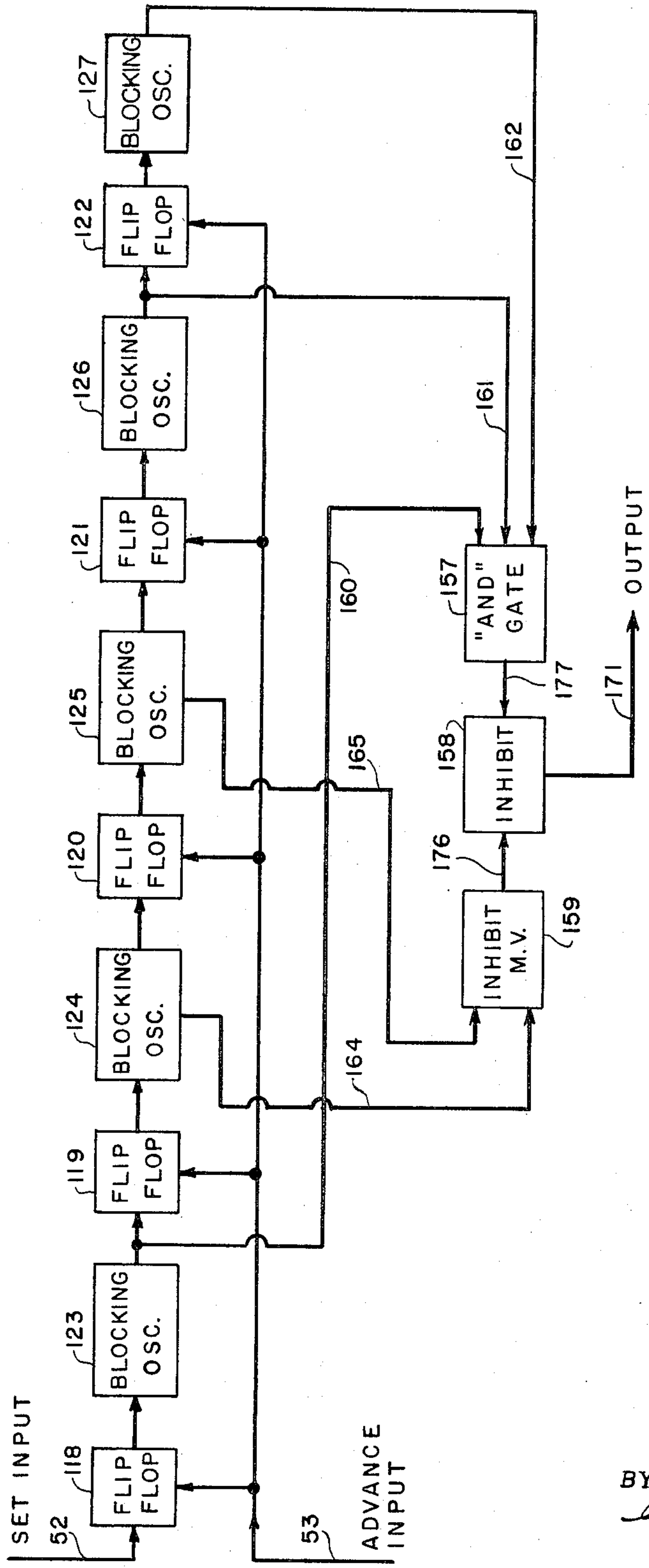
FIG. 5 is a block diagram of the decoder.

FIG. 5 shows that the outputs from all flip flops which recognize the "one" bits are tied, through their associated blocking oscillators, to an AND gate 157 by conductors 160–162. Thus, if these flip flops are in a "one" state when the last "advance" pulse in the train occurs, each flip flop will simultaneously generate an output, and an output will be obtained from the AND gate 157. This pulse is applied to an "inhibit" circuit 158. Pulses applied to the "inhibit" circuit via an "inhibit" multivibrator 159 are used to prevent the "inhibit" gate from producing an output pulse. All flip flops used to recognize a "zero" bit are tied to the "inhibit" multivibrator 159 by conductors 164–165. If they are in the "zero" state when the last "advance" pulse is applied, an over-all output will occur at 171, and the pulse from the AND gate 157 will pass through the "inhibit" circuit 158 and serve as an output. However, if one of the inputs to multivibrator 159 is in the "one" state, an "inhibit" pulse will be applied from 159 to 158, and there will be no output at 171. Likewise, if one of the inputs to gate 157 is in the "zero" state, no output will be obtained from the AND gate 157 and there will be no output from the "inhibit" gate 158. Therefore, an output will occur only when a correct code is applied to the decoder. Decoding may be changed merely by removing an output from the "inhibit" multivibrator 159 and connecting it to the AND gate 157, or vice versa.

The AND circuit 157 is a simple series AND circuit comprising transistors 166, 167, and 168, all NPN types and all connected with their emitter-collector circuits in series between the energizing line 63 and ground line 138. Between each input line such as 160 and the corresponding transistor such as 166 is connected a resistance-capacitance network such as 169, 170. The AND gate 157 furnishes an output, through inhibitor 158, to line 171 (FIGS. 2, 4, and 5) if there is no inhibition—i.e., if the correct code has been received and the flip flops which are supposed to be in the "zero" and "one" states are in fact in those states. The inhibitor 158 comprises a symmetrical pair of transistors, NPN transistor 173 and PNP transistor 172, connected with their emitter-collector circuits in series with each other and with a resistor 174 between the energizing line 63 and ground. Disposed between the collector of transistor 172 and ground is a resistor 175. An input line 176 runs from the multivibrator 159 over to the base of transistor 173 of inhibitor 158 in order to cause the inhibiting function to be performed in the event that the two "zeros" are not being applied to multivibrator 159.

Referring now to multivibrator 159, it comprises a complementary pair of transistors 178 and 179, the base of PNP type transistor 179 being coupled to the collector of transistor 178 by a resistor 180 and capacitor 181, the base of transistor 178 being connected to the collector of 179 by resistor 182. Collector load resistor 183 is connected between the collector of transistor 179 and ground, and collector load resistor 184 is connected between the collector of transistor 178 and the energizing line.

Let us now consider the inputs. Line 165, representing the output of blocking oscillator 125, is coupled to the base of transistor 179 by series capacitor 187, series diode 188, and shunt resistor 189. The coupling from line 164 to the base of transistor 179 is identical with that just described. Resistor 190, shunted by diode 191, is connected between emitter and base of transistor 179.

Figure 6:
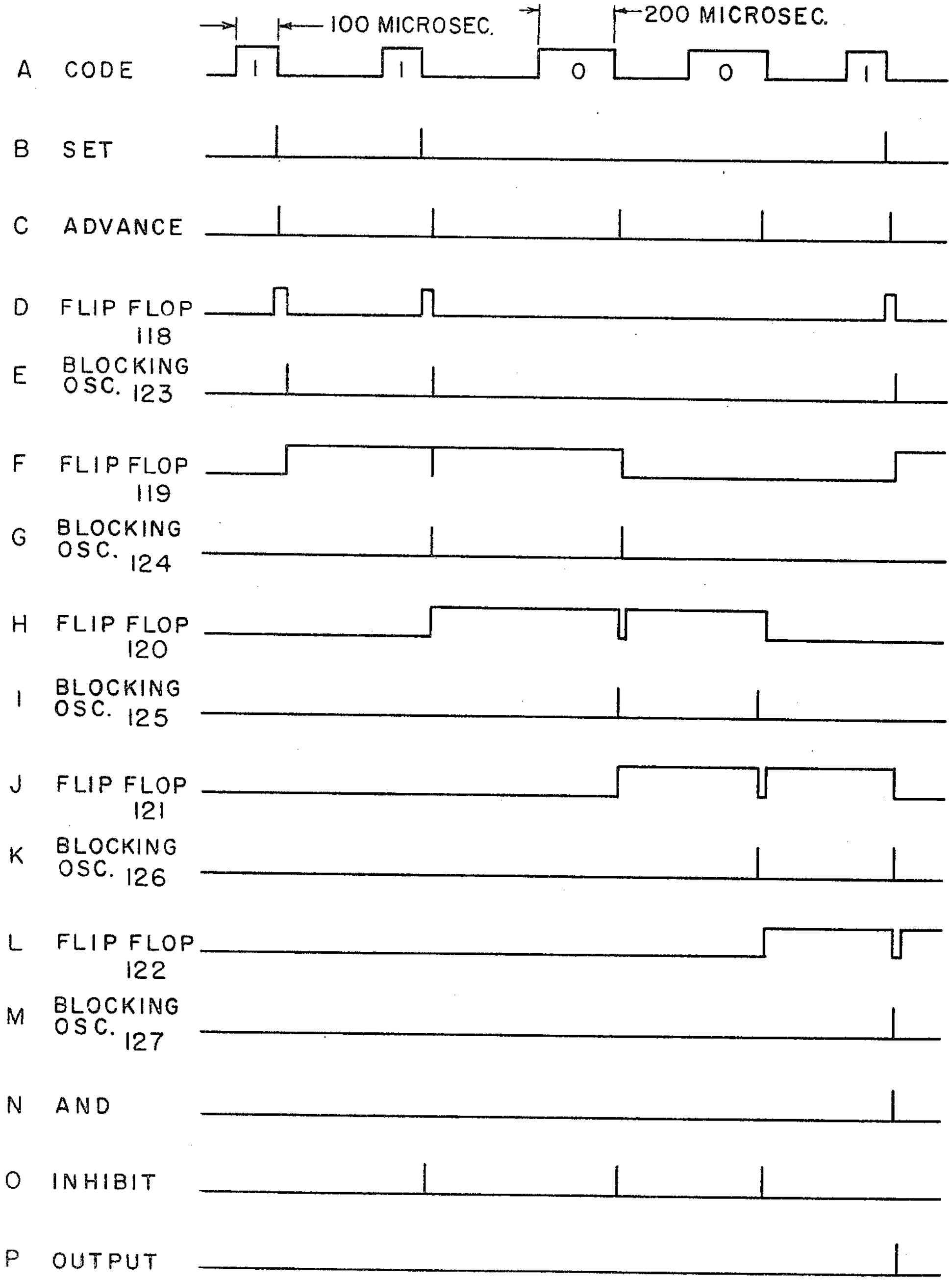
FIG. 6 is a timing diagram of the decoder.

Now considering the operation of the decoder illustrated in FIGS. 4 and 5, and assuming the application of the code "11001" to the decoder, the cycle of operation of the decoder will be understood from the timing diagram of FIG. 6. Timing diagrams are per se well known to the art, and the curves A–P, inclusive, indicate the events which occur at the various decoder elements.

Figure 2:
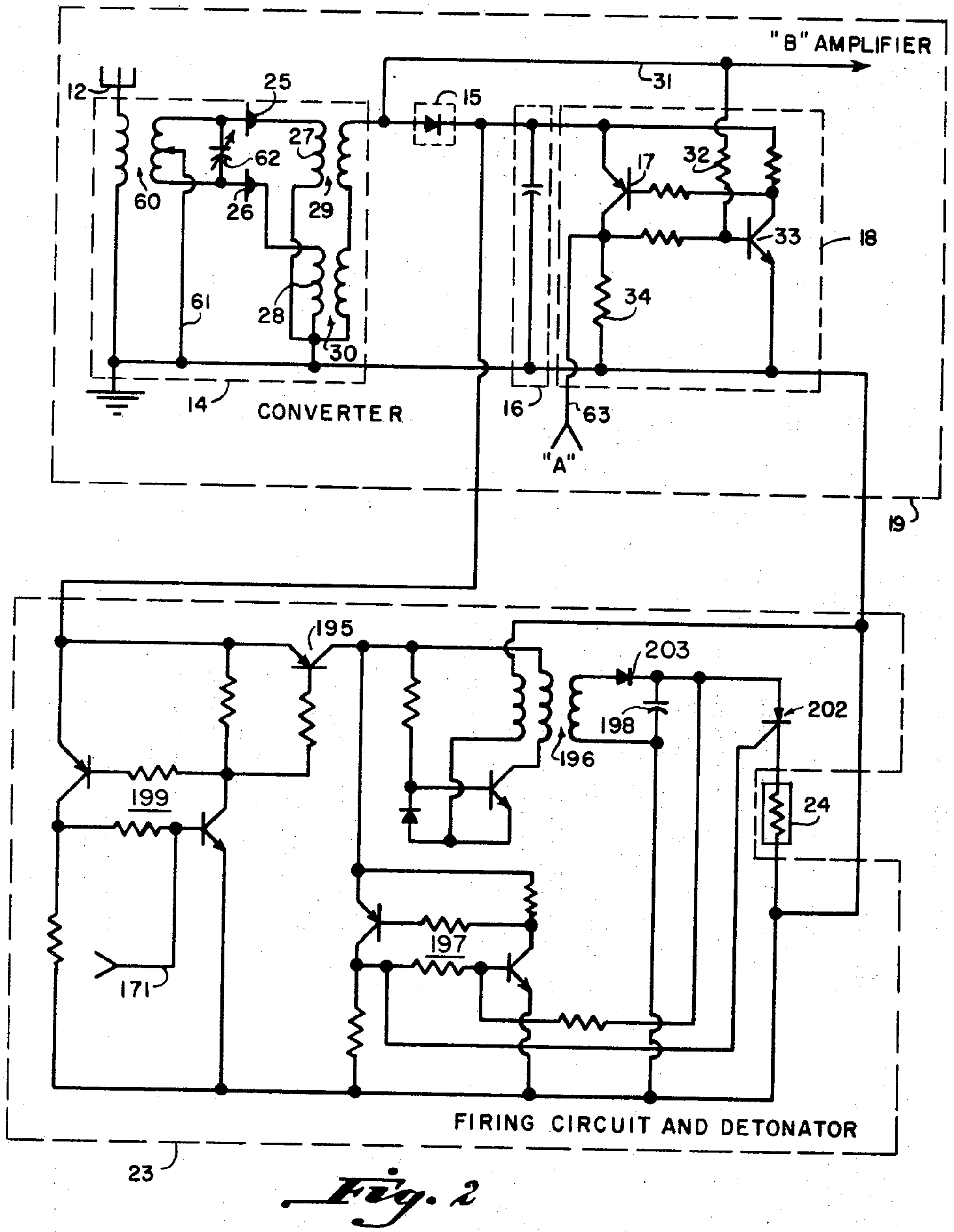
FIG. 2 is a circuit schematic of the energy conversion unit in accordance with the invention, as associated with a firing circuit and detonator.

The description now proceeds to the firing circuit illustrated in FIG. 2. Flip flop 199 is used to control the base lead impedance of transistor 195. This complementary flip flop 199 is normally in the off state, thereby causing transistor 195 to be non-conducting. Therefore, no power is applied to the blocking oscillator 196 or flip flop 197. When a "fire" pulse is received on line 171, flip flop 199 is turned on and causes transistor 195 to saturate. As a result, power is applied to the blocking oscillator 196 and flip flop 197. The blocking oscillator 196, which is free-running, supplies charging pulses to capacitor 198 via diode 203. When capacitor 198 reaches a predetermined potential, flip flop 197 is turned on, causing the silicon control rectifier 202 to conduct. The silicon control rectifier discharges capacitor 198 through the detonator 24, thereby causing it to fire. The firing circuit provides a means of firing an electric detonator when the energy source is lower in potential than the firing potential of the detonator.

While there has been shown and described what is at present considered to be the preferred embodiment of the invention, it will be obvious to those skilled in the art that various modifications and changes may be made therein without departing from the true scope of the invention as defined by the appended claims. For example, the FIG. 2 converter embodiment as illustrated includes a pair of pulse transformers 29–30 and is operable with pulse input signals. It will be understood that the FIG. 2 converter is operable with continuous wave input when R.F. (radio frequency) transformers are substituted for the pulse transformers shown.

We claim:

1. A circuit for the collection, storage and release of radio frequency energy comprising:
   - means for intercepting bursts of electromagnetic radiations,
   - an input transformer coupled to said intercepting means and having two output terminals and a center tap to provide a balanced output,
   - a connection between said center tap and a point of reference potential,
   - capacitance means connected across said terminals for tuning the output of said input transformer,
   - first and second tunnel diodes individually connected to said end terminals to convert said bursts into pulses,
   - first and second pulse transformers having first and second primaries and first and second secondaries,
   - each of the first and second primaries being connected between a respective one of said tunnel diodes and said point of reference potential,
   - a rectifier for rectifying said pulses, said rectifier having an input and an output,
   - said first and second secondaries being connected additively between the input of said rectifier and said point of reference potential, and

- a storage capacitor connected between the output of said rectifier and said point of reference potential,
   - and means for the release of the energy stored in said capacitor.

2. A circuit for the collection, storage and release of radio frequency energy comprising:
   - means for intercepting bursts of electromagnetic radiations,
   - an input transformer coupled to said intercepting means and having two output terminals and a center tap to provide a balanced output,
   - a connection between said center tap and a point of reference potential,
   - capacitance means connected across said terminals for tuning the output of said input transformer,
   - first and second tunnel diodes individually connected to said end terminals to convert said bursts into pulses,
   - first and second pulse transformers having first and second primaries and first and second secondaries,
   - each of the first and second primaries being connected between a respective one of said tunnel diodes and said point of reference potential,
   - a rectifier for rectifying said pulses, said rectifier having an input and an output,
   - said first and second secondaries being connected additively between the input of said rectifier and said point of reference potential,
   - a storage capacitor connected between the output of said rectifier and said point of reference potential,
   - means for the release of the energy stored in said capacitor,
   - a first transistor of one conductivity type and having a first emitter, a first base and a first collector,
   - a second transistor of the opposite conductivity type and having a second emitter, a second base and a second collector,
   - first and second collector load resistors, the first collector load resistor and the emitter-collector circuit of the first transistor being connected in series across said storage capacitor to provide a discharge path therefor, and, at said first collector, a power take-off point,
   - the first emitter being connected to the output of said rectifier and the second emitter being connected to said point of reference potential,
   - a resistive connection between the first collector and the second base and a resistive connection between the second collector and the first base,
   - said second collector load resistor and the emitter-collector circuit of the second transistor being connected in series across said storage capacitor,
   - whereby the two transistors and their collector load resistors and said resistive connection comprise a two state flip-flop and,
   - a resistive connection from said rectifier output to said second base whereby the voltage across said storage capacitor and the products of rectification appearing at said output, in conjunction, trigger said first emitter-first collector circuit into conductivity, and said flip-flop into one of its two states, providing for the discharge of said capacitor, said flip-flop assuming its other state following said discharge.

References Cited

UNITED STATES PATENTS

| | | | |
|---|---|---|---|
| 2,813,242 | 11/1957 | Grump | 325—492 X |
| 2,918,573 | 12/1959 | Hollmann | 325—492 X |
| 3,119,072 | 1/1964 | Sommers | 325—449 |

OTHER REFERENCES

Hollmann, H. E.: Designing "Free-Power" AM and FM Transistorized Receivers. In Electronic Industries, September 1956, pp. 54–56 and 92–95.

KATHLEEN H. CLAFFY, *Primary Examiner.*

R. LINN, *Assistant Examiner.*